United States Patent
Makki et al.

(10) Patent No.: US 12,328,177 B2
(45) Date of Patent: Jun. 10, 2025

(54) METHOD TO DETERMINE THE CAPABILITY OF SIMULTANEOUS OPERATION IN IAB NODES

(71) Applicant: Telefonaktiebolaget LM Ericsson (publ), Stockholm (SE)

(72) Inventors: Behrooz Makki, Pixbo (SE); Magnus Åström, Lund (SE); Yezi Huang, Täby (SE); Lei Bao, Gothenburg (SE); Boris Dortschy, Vendelsö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 289 days.

(21) Appl. No.: 18/026,153

(22) PCT Filed: Sep. 13, 2021

(86) PCT No.: PCT/SE2021/050878
§ 371 (c)(1),
(2) Date: Mar. 14, 2023

(87) PCT Pub. No.: WO2022/055414
PCT Pub. Date: Mar. 17, 2022

(65) Prior Publication Data
US 2023/0361857 A1     Nov. 9, 2023

Related U.S. Application Data

(60) Provisional application No. 63/077,834, filed on Sep. 14, 2020.

(51) Int. Cl.
*H04B 7/15*         (2006.01)
*H04B 7/155*       (2006.01)

(52) U.S. Cl.
CPC ................ *H04B 7/15557* (2013.01)

(58) Field of Classification Search
CPC .................................. H04B 7/15557
See application file for complete search history.

(56) References Cited

U.S. PATENT DOCUMENTS 12,004,195 B2 *    6/2024    Abedini ............... H04W 72/20
2013/0064204 A1    3/2013    Sun et al.
(Continued)

OTHER PUBLICATIONS

PCT International Search Report and Written Opinion for International Application No. PCT/SE2021/050878 mailed Dec. 22, 2021, 13 pages.
(Continued)

*Primary Examiner* — Hashim S Bhatti
(74) *Attorney, Agent, or Firm* — Sage Patent Group

(57) ABSTRACT

A method and network node having integrated access and backhaul (IAB) functionality are disclosed. According to one aspect, a network node determines information concerning at least one of: (i) an impairment of a first signal from a first integrated access backhaul node that is caused by a second signal from a second IAB node and (ii) an impairment of the second signal that is caused by the first signal. The network node further selects a multiplexing capability for the network node based at least in part on the determined information concerning at least one of the impairments and further multiplexes signals for the first and second IAB nodes using the selected multiplexing capability.

18 Claims, 7 Drawing Sheets

(56) References Cited

U.S. PATENT DOCUMENTS

| | | | |
|---|---|---|---|
| 2020/0107362 A1* | 4/2020 | Qi | H04W 88/085 |
| 2020/0351753 A1* | 11/2020 | Luo | H04W 24/08 |
| 2021/0029025 A1* | 1/2021 | Abedini | H04W 88/04 |
| 2021/0298036 A1* | 9/2021 | Luo | H04W 72/535 |

OTHER PUBLICATIONS

Cewit et al., "Discussion on Simultaneous Operation of IAB-node's Child and Parent Links", 3GPP TSG RAN WG1 Meeting #102-e, R1-2006347, e-Meeting, Aug. 17-28, 2020, 5 pages.

Qualcomm, "New WID on Enhancements to Integrated Access and Backhaul", 3GPP TSG RAN Meeting #86, RP-193251 (revision of RP-193145), Sitges, Spain, Dec. 9-12, 2019, 5 pages.

3GPP, Technical Specification Group Radio Access Network, NR, "Physical Layer Procedures for Control (Release 16)", 3GPP TS 38.213 V16.2.0 (Jun. 2020), France, 176 pages.

RAN1 Chairman's Notes, 3GPP TSG RAN WG1 Meeting #98bis, Chongqing, China, Oct. 14-20, 2019, 106 pages.

RAN1 Chairman's Notes, 3GPP TSG RAN WG1 Meeting #99, Reno, USA, Nov. 18-22, 2019, 133 pages.

* cited by examiner

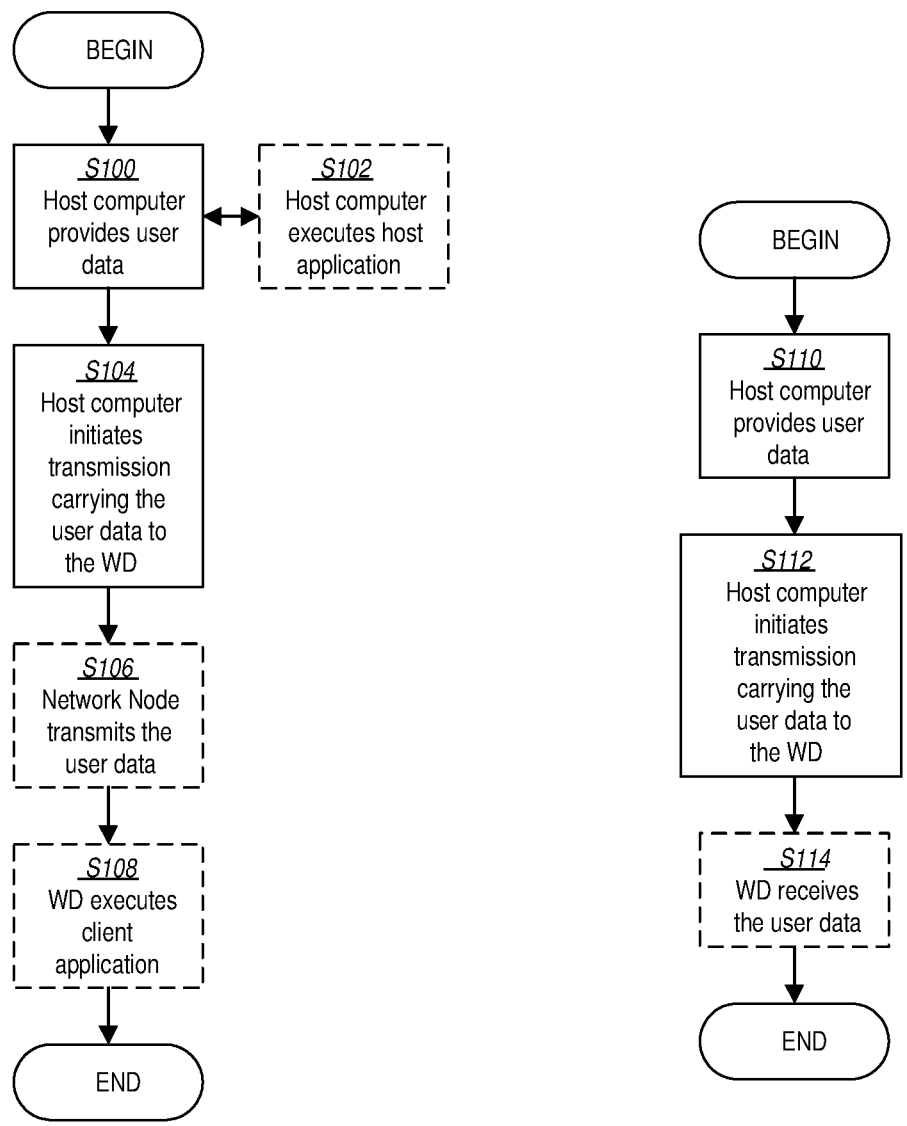

METHOD TO DETERMINE THE CAPABILITY OF SIMULTANEOUS OPERATION IN IAB NODES

CROSS-REFERENCE TO RELATED APPLICATIONS

This application is a 35 U.S.C. § 371 national stage application for International Application No. PCT/SE2021/050878, entitled "METHOD TO DETERMINE THE CAPABILITY OF SIMULTANEOUS OPERATION IN IAB NODES", filed on Sep. 13, 2021, which claims priority to U.S. Provisional Application No. 63/077,834, entitled "METHOD TO DETERMINE THE CAPABILITY OF SIMULTANEOUS OPERATION IN IAB NODES", filed on Sep. 14, 2020 assigned to the assignee hereof, and expressly incorporated herein by reference.

FIELD

The present disclosure relates to wireless communications, and in particular, to determining a capability of simultaneous operation in integrated access and backhaul (IAB) nodes.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. To connect WDs in one geographical to WDs in other remote geographical areas, it is necessary to provide a backhaul network that connects the WDs in each of the geographical areas. For example, a message from a first WD in Los Angeles intended for a second WD in New York may be received by a local base station in Los Angeles, be transferred from the local base station to a backhaul network, which may include the Internet and/or the Public Switched Telephone Network (PSTN), to a base station in New York serving the second WD.

New Radio is expected to provide high-rate data streams which require large bandwidths. In the millimeter wave (MW)-region, with potentially multiple-input and multiple-output (MIMO) links, there is the opportunity to obtain sufficiently large bandwidths and data rates. Importantly, the presence of large bandwidths makes it possible to include the wireless backhaul transport in the same spectrum as the wireless access. For this reason, integrated access and backhaul (IAB) network nodes are currently being considered as one of the main applications of MW spectrum. With IAB, a potentially fiber-connected access point (AP) provides other APs as well as the WDs inside its cell area with wireless backhaul and access connections, respectively. The purpose of IAB is to replace existing backhaul with flexible wireless backhaul using the 3GPP bands, providing not only backhaul but also existing cellular services in the same node. By using the 3GPP bands for wireless backhaul flexibility and reduced cost as compared to wired backhaul, which in certain deployments could impose a large cost for the installation and operation of the base station.

In a multi-hop IAB network, each IAB node in the chain of the nodes acts as a child node to upstream IAB nodes and as a parent node to downstream IAB nodes. The IAB donor is the only node connected to the core network via fiber. Each IAB node, wirelessly connected to the core network in a multi-hop fashion, contains a distributed unit (DU) function and a mobile termination (MT) function. Through the MT, the IAB node connects to an upstream IAB node or the IAB donor. By the DU, the IAB node connects to WDs and the MTs of downstream IAB-nodes. That is, the IAB-MT is responsible for the backhaul communication to the parent IAB-DU. The IAB-DU is responsible for both WD access (both uplink (UL) and downlink (DL)), as well as for backhaul to the child IAB-MT (both DL and UL).

In 3GPP Technical Release 16 (Rel-16), simultaneous transmission and reception were not considered. However, to reduce the latency of backhaul traffic and to improve the end-to-end (E2E) throughput/delay, the IAB-MT and IAB-DU of one IAB node could be receiving and transmitting simultaneously. For this reason, objectives being considered in 3GPP Release 17 (Rel-17) include methods that support simultaneous transmission and reception (see, e.g., 3GPP RP-193251: "New WID on Enhancements to Integrated Access and Backhaul," [1]).

The following has been considered:
The donor central unit (CU) and the parent node can be made aware of the multiplexing capability between MT and DU (time division multiplexing (TDM) required or TDM not required) of an IAB node for any {MT CC, DU cell} pair; signaling details up to RAN2/RAN3.

The following has also been considered:
The indication of the multiplexing capability for the case of no-TDM between IAB MT and IAB DU is additionally provided with respect to each transmission-direction combination (per MT CC/DU cell pair):
MT-TX/DU-TX
MT-TX/DU-RX
MT-RX/DU-TX
MT-RX/DU-RX Note: This does not necessarily require any additional specification impact in RAN1 in 3GPP Rel-16, i.e., in Rel-16 the behavior of the IAB node is only defined for TDM cases. The behavior for no-TDM is left to IAB-node/network implementation in 3GPP Rel-16.

Let the vector $t_l$ map a signal $S_l$ to N transmit antennas for a node l. The resulting signal $t_l S_l$ is transmitted over a propagation channel, characterized by a matrix $H_l$, which is assumed to be a random variable. For node l, the effective channel $h_l = H_l t_l$, is also random.

The ($m^{th}$, $n^{th}$) element of $H_l$ contains the channel coefficients between transmit antenna n and receive antenna m. This channel model is common for signals with a narrow bandwidth in relation to the coherence bandwidth, e.g., orthogonal frequency division multiplexed (OFDM) signals.

At the receiver, the resulting output of the antennas is $h_l S_l$. The aggregated array output vector x is the superposition of the signals of all K nodes plus a random noise signal n such that $$x = \sum_{l \in K} h_l S_l + n$$

The transmitted signals $S_1, S_2, \ldots, S_K$, can be recovered by a bank of linear filters or beamformers $w_1, w_2, \ldots, w_K$. The output $y_k$ of the $k^{th}$ filter is:

$$y_k = w_k^H \left( \sum_{l=1}^{K} h_l S_l + n \right) = w_k^H h_k S_k + \sum_{l \neq k} w_k^H h_l S_l + w_k^H n$$

where, in the rightmost part, the components constitute signal, interference and noise, respectively.

Assuming statistical channel and noise properties, the spatial covariance matrix of node k's channel is $R_k = E[h_k h_k^H]$ and the noise variance is $E[nn^H] = \sigma^2 I$, the signal to interference plus noise ratio, SINR for node k and the transmit power vector p can be expressed as $$SINR_k(p, w_k) = \frac{E\left[|w_k^H h_k S_k|^2\right]}{E\left[\left|\sum_{l \neq k} w_k^H h_l S_l + w_k^H n\right|^2\right]} = \frac{p_k w_k^H R_k w - k}{w_k^H \left(\sum_{l \neq k} p_l R_l + \sigma_n^2 I\right) w_k}$$

The beamforming vector $w_k$ that maximizes SINR in the receiver is anyone that fulfills $$\left(\sum_{l \neq k} p_l R_l + \sigma_n^2 I\right)^{-1} R_k w_k = \lambda_{max} w_k$$

where $\lambda_{max}$ is the maximum eigenvalue of the matrix $$\left(\sum_{l \neq k} p_l R_l + \sigma_n^2 I\right)^{-1} R_k$$

Two methods that fulfill the above criterium are zero forcing algorithms, in which $w_k^H R_k w_k = 0$ and spatial matched filtering where $\|w_k\|^2$ is minimized.

If $h_k$ is instead deterministic, as is the case with a known, stationary channel, then $R_k = h_k h_k^H$ and the optimal beamforming vector becomes $$\hat{w}_k = \left(\sum_{l \neq k} p_l R_l + \sigma_n^2 I\right)^{-1} h_k$$

that can instead be used in determining the SINR above.

Although reception of simultaneous signals from different nodes (e.g., IAB parent nodes and IAB child nodes) and simultaneous transmission from the DU and MT of an IAB node are accepted in IAB networks, there is still no efficient method to evaluate the capability of simultaneous signal reception/transmission. As a result, depending on an interference power level, the performance gain in simultaneously transmitting and receiving may decrease.

SUMMARY

Some embodiments advantageously provide methods, and IAB nodes for determining a capability of simultaneous operation in integrated access and backhaul (IAB) nodes.

In some embodiments, efficient methods to determine the capability of simultaneous transmission and reception at the DU and MT of an IAB-node based on conditions of channel or transmitter properties or receiver properties are provided.

A method is provided to determine the capability of simultaneous reception, as well as simultaneous transmission of an IAB node, in IAB networks. In some embodiments, information about interference due to space division multiplexed (SDM) or frequency division multiplexed (FDM) data transmission on the DU and MT of the IAB node is determined and used to determine the capability of, e.g., simultaneous reception. Also, the involved nodes, e.g., the parent and child IAB nodes, may be informed to adapt their transmission parameters correspondingly, and the scheduling of the child IAB nodes (or WDs) are determined based on the SDM or FDM data transmission capability.

In some methods described herein, the network spectral efficiency is improved over known arrangements and latency of backhaul traffic is reduced compared to known arrangements. Also, end to end network throughput is improved. Some embodiments are applicable for both simultaneous transmission and reception.

According to an aspect, a method implemented in a network node is provided. The method includes determining information concerning at least one of: (i) an impairment of a first signal from a first integrated access backhaul, IAB, node that is caused by a second signal from a second IAB node and (ii) an impairment of the second signal that is caused by the first signal; selecting a multiplexing capability for the network node based at least in part on the determined information concerning at least one of the impairments; and multiplexing signals for the first and second IAB nodes using the selected multiplexing capability.

In some embodiments of this aspect, the method further includes sending information about the selected multiplexing capability to at least one of the first IAB node, the second IAB node and a wireless device, WD. In some embodiments of this aspect, the selected multiplexing capability is one of a space division multiplexing, SDM, capability, a frequency division multiplexing, FDM, capability and a time division multiplexing, TDM, capability. In some embodiments of this aspect, at least one of the SDM and FDM capability is a simultaneous transmission of a mobile termination, MT, function and a distributed unit, DU, function at the network node. In some embodiments of this aspect, at least one of the SDM and FDM capability is a simultaneous reception of a mobile termination, MT, function and a distributed unit, DU, function at the network node.

In some embodiments of this aspect, at least one of the SDM and FDM capability is a simultaneous transmission and reception of a mobile termination, MT, function and a distributed unit, DU, function at the network node. In some embodiments of this aspect, selecting the multiplexing capability comprises selecting the SDM capability when the network node is SDM capable; otherwise, selecting one of the FDM capability and the TDM capability. In some embodiments of this aspect, multiplexing the signals for the first and second IAB nodes comprises simultaneously receiving a third signal from the first IAB and a fourth signal from the second IAB node using the selected multiplexing capability. In some embodiments of this aspect, multiplexing the signals for the first and second IAB nodes comprises simultaneously transmitting a third signal to the first IAB and a fourth signal to the second IAB node using the selected multiplexing capability.

In some embodiments of this aspect, the determined information corresponds to a level of cross link interference, CLI. In some embodiments of this aspect, the determined information includes at least one of a signal-to-noise plus interference ratio, SINR, a reference signal received quality, RSRQ, a reference signal received power, RSRP, and a signal strength indicator, RSSI. In some embodiments of this aspect, the multiplexing capability is based at least in part on an adjustment of at least one of: a transmit power, a beam configuration and a modulation and coding scheme, MCS. In some embodiments of this aspect, the method further includes receiving requirement information prior to receiving the first signal from the first IAB node, the requirement information comprising information concerning at least one of: an interference level threshold, a backhaul link minimum data rate and a link reliability.

In some embodiments of this aspect, the method further includes determining a transmit power relation based at least in part on a cross link interference, CLI, threshold. In some embodiments of this aspect, the transmit power relation that is based at least in part on the CLI threshold is at least one of a minimum power relation and a maximum power relation. In some embodiments of this aspect, the method further includes transmitting the transmit power relation to at least one of the first and second IAB nodes. In some embodiments of this aspect, the first IAB node is one of a wireless device, WD, a parent IAB node and a child IAB node to the network node and the second IAB node is another one of the WD, the parent IAB node and the child IAB node.

According to another aspect of the present disclosure, a network node configured to communicate with a wireless device, WD, is provided. The network node comprises processing circuitry. The processing circuitry is configured to cause the network node to: determine information concerning at least one of: (i) an impairment of a first signal from a first integrated access backhaul, IAB, node that is caused by a second signal from a second IAB node and (ii) an impairment of the second signal that is caused by the first signal; select a multiplexing capability for the network node based at least in part on the determined information concerning at least one of the impairments; and multiplex signals for the first and second IAB nodes using the selected multiplexing capability.

In some embodiments of this aspect, the processing circuitry is configured to cause the network node to send information about the selected multiplexing capability to at least one of the first IAB node, the second IAB node and a wireless device, WD. In some embodiments of this aspect, the selected multiplexing capability is one of a space division multiplexing, SDM, capability, a frequency division multiplexing, FDM, capability and a time division multiplexing, TDM, capability. In some embodiments of this aspect, at least one of the SDM and FDM capability is a simultaneous transmission of a mobile termination, MT, function and a distributed unit, DU, function at the network node.

In some embodiments of this aspect, at least one of the SDM and FDM capability is a simultaneous reception of a mobile termination, MT, function and a distributed unit, DU, function at the network node. In some embodiments of this aspect, at least one of the SDM and FDM capability is a simultaneous transmission and reception of a mobile termination, MT, function and a distributed unit, DU, function at the network node. In some embodiments of this aspect, selecting the multiplexing capability comprises selecting the SDM capability when the network node is SDM capable; otherwise, selecting one of the FDM capability and the TDM capability. In some embodiments of this aspect, the processing circuitry is configured to multiplex the signals for the first and second IAB nodes by being configured to cause the network node to simultaneously receive a third signal from the first IAB and a fourth signal from the second IAB node using the selected multiplexing capability.

In some embodiments of this aspect, the processing circuitry is configured to multiplex the signals for the first and second IAB nodes by being configured to cause the network node to simultaneously transmit a third signal to the first IAB and a fourth signal to the second IAB node using the selected multiplexing capability. In some embodiments of this aspect, the determined information corresponds to a level of cross link interference, CLI. In some embodiments of this aspect, the determined information includes at least one of a signal-to-noise plus interference ratio, SINR, a reference signal received quality, RSRQ, a reference signal received power, RSRP, and a signal strength indicator, RSSI. In some embodiments of this aspect, the multiplexing capability is based at least in part on an adjustment of at least one of: a transmit power, a beam configuration and a modulation and coding scheme, MCS.

In some embodiments of this aspect, the processing circuitry is further configured to cause the network node to receive requirement information prior to receiving the first signal from the first IAB node, the requirement information comprising information concerning at least one of: an interference level threshold, a backhaul link minimum data rate and a link reliability. In some embodiments of this aspect, the processing circuitry is further configured to cause the network node to determine a transmit power relation based at least in part on a cross link interference, CLI, threshold.

In some embodiments of this aspect, the transmit power relation that is based at least in part on the CLI threshold is at least one of a minimum power relation and a maximum power relation. In some embodiments of this aspect, the processing circuitry is further configured to cause the network node to transmit the transmit power relation to at least one of the first and second IAB nodes. In some embodiments of this aspect, the first IAB node is one of the WD, a parent IAB node and a child IAB node to the network node and the second IAB node is another one of the WD, the parent IAB node and the child IAB node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
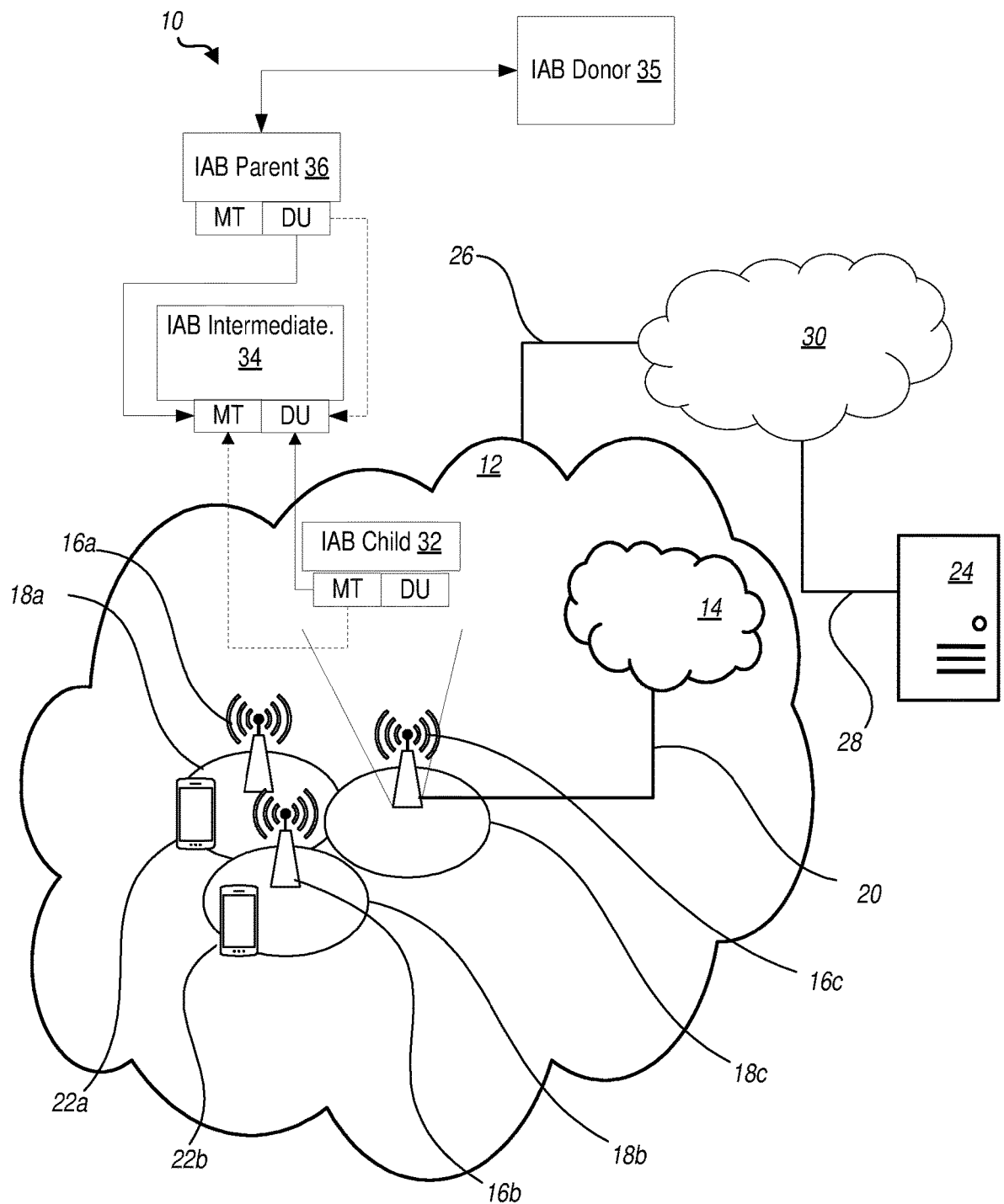
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to determining a capability of simultaneous operation in integrated access and backhaul (IAB) nodes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In particular, a network node may be configured as an IAB node or include functionality of an IAB node. The network node may be an IAB child node such as a base station, or an IAB parent node or an intermediate node between an IAB parent node and an IAB child node. A network node may also be an IAB donor node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc. In some embodiments, a WD may include functionality of an IAB node and may be a IAB parent node to other WDs.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the phrase "multiplexing capability" is used to indicate a multiplexing mode of operation at an IAB node, e.g., a preferred multiplexing mode of operation that is based on information such as impairment information as described in more detail below.

In some embodiments, the phrase "network node" is used to indicate a network node that includes IAB node functionality, such as the intermediate IAB node functionality described herein. For example, such network node may receive signaling from its IAB parent and IAB child and make certain determinations and/or scheduling related decisions based on the received signaling.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, a method and network node for determining a capability of simultaneous operation in an integrated access and backhaul (IAB) nodes are provided. In some embodiments, efficient methods for simultaneous transmission and/or reception of the IAB nodes are provided that increase end to end throughput and reduce the latency of the backhaul traffic. For at least these reasons, methods for determining the capability of simultaneous reception and transmission of IAB network nodes are provided.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16, such as network node 16c, may operate as an IAB child node 32 and be configured with an MT and a DU. The MT of the IAB child node may send backhaul traffic to a DU of an IAB intermediate node 34. The signal carrying the backhaul traffic from the IAB child node 32 may simultaneously interfere with a forward traffic signal being received by the MT of the IAB intermediate node 34 from a DU of an IAB parent node 36. In FIG. 1, the desired signals between the IAB nodes 32, 34 and 36 are represented by solid arrows, whereas the interfering signals are represented by dashed lines. Similarly, the forward traffic signal from the DU of the IAB parent node 36 may interfere at the IAB intermediate node 34 with the backhaul traffic signal from the MT of the IAB child node 32. An IAB donor 35 may communicate with the IAB parent node 36 to complete communication paths from a plurality of wireless devices 22 to a plurality of remote locations served by other remote base stations. Thus, for ease of understanding and explanation, a network node 16 that is functioning as, or includes IAB child functionality may be referred to herein as IAB child node 32. It is therefore understood that the physical components of IAB child node 32 (or any other IAB node) may include those described herein with respect to a network node 16.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. As noted above, the network node 16 may have IAB functionality including MT and DU functionality, such as the functionality of the IAB child node 32, and/or the functionality of the IAB intermediate node 34 and/or the functionality of the IAB parent node 36. This functionality may reside at least in part in the radio interface 62 of hardware 58 and/or at least in part in the processing circuitry 68. The hardware 58 may include a communication interface 60 for setting up and maintaining a wired or wireless connection with an interface of a different communication device of the communication system 10, as well as the radio interface 62 for setting up and maintaining at least one of a wireless connection 64 with a WD 22 located in a coverage area 18 served by the network node 16, which has IAB node functionality, and/or a wireless connection with at least another network node serving as an IAB parent node 36 or an IAB child node 32. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include IAB child node functionality 32 configured to provide MT and DU functionality.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. In some embodiments, the radio interface 82 performs the functions and has the functionality of an IAB node such as an IAB intermediate node and/or IAB parent node and/or IAB child node, including MT and DU functionality.

The hardware 80 of the WD 22 further includes processing circuitry 84. Note that some or all of the IAB node functionality described may be implemented at least in part in the processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
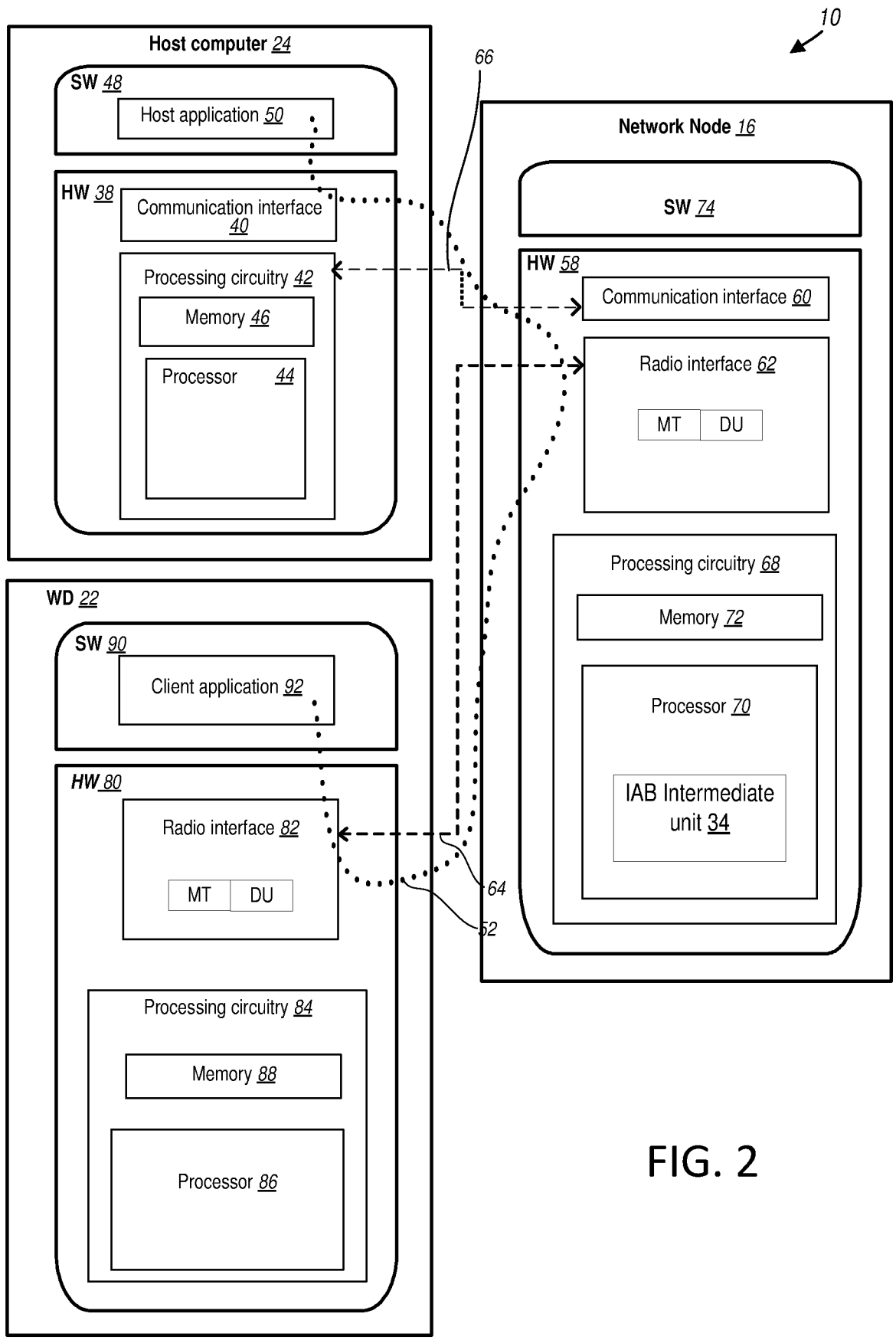
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

FIG. 2 shows various "units" such as an IAB intermediate unit 34 as being within the processing circuitry and an MT and a DU as being within a radio interface, it is contemplated that these units may be implemented such that a portion of the unit is stored in a corresponding memory within the processing circuitry. In other words, the units may be implemented in hardware or in a combination of hardware and software within the processing circuitry and/or the radio interface.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
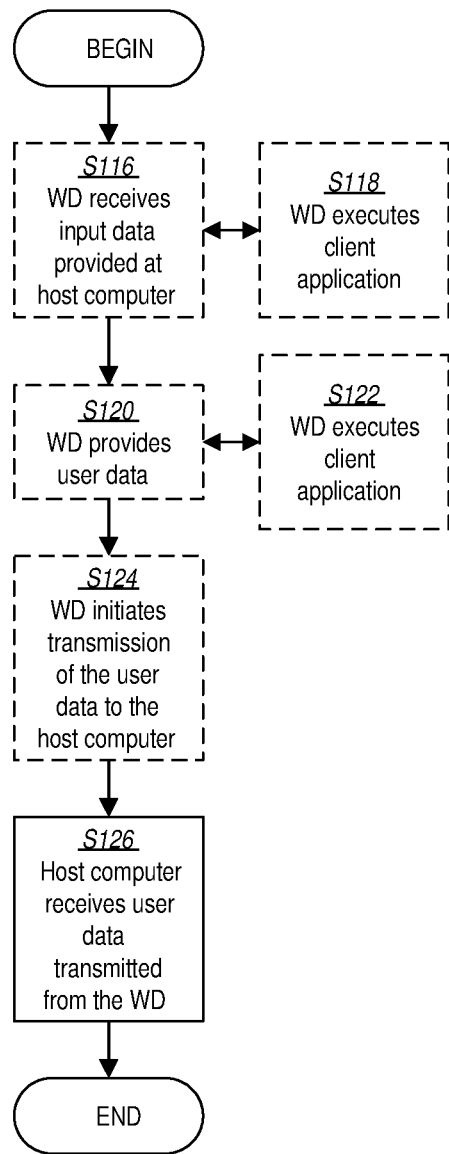
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
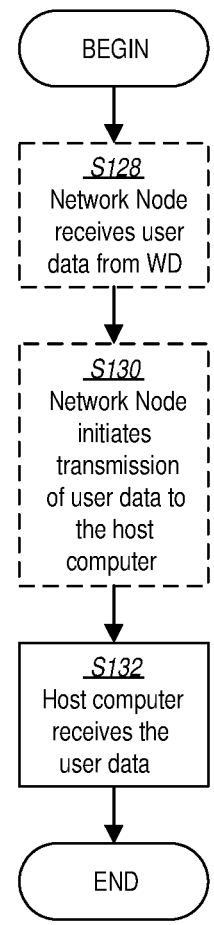
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
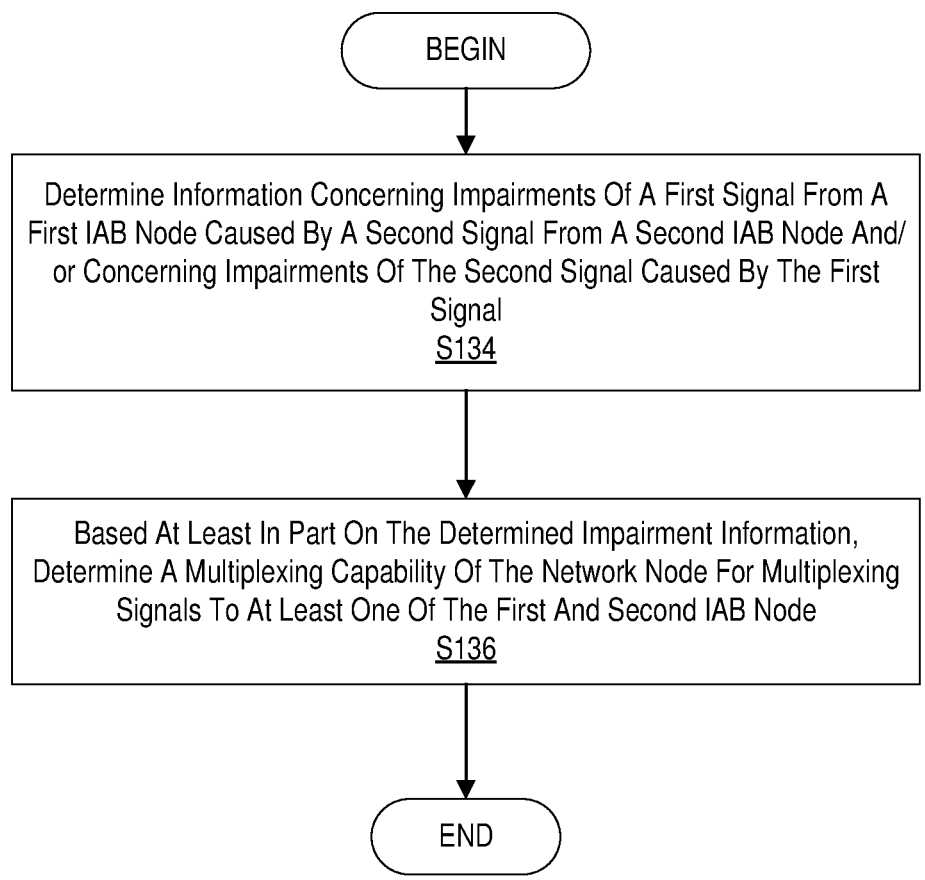
FIG. 7 is a flowchart of an exemplary process in a network node for determining a capability of simultaneous operation in integrated access and backhaul (IAB) nodes.

FIG. 7 is a flowchart of an exemplary process in a network node 16 for determining a capability of simultaneous operation in an integrated access and backhaul (IAB) nodes. The One or more blocks described herein may be performed by one or more elements of network node 16 such as by one or more of processing circuitry 68, processor 70, radio interface 62 and/or communication interface 60. Network node 16 such as via processing circuitry 68 and/or processor 70 and/or radio interface 62 and/or communication interface 60 is configured to determine (Block S134) information concerning impairments of a first signal from a first IAB node caused by a second signal from a second IAB node and/or concerning impairments of the second signal caused by the first signal. The process also includes, based at least in part on the determined impairment information, determining (Block S136) a multiplexing capability of the network node for multiplexing signals to at least one of the first and second IAB node.

Figure 8:
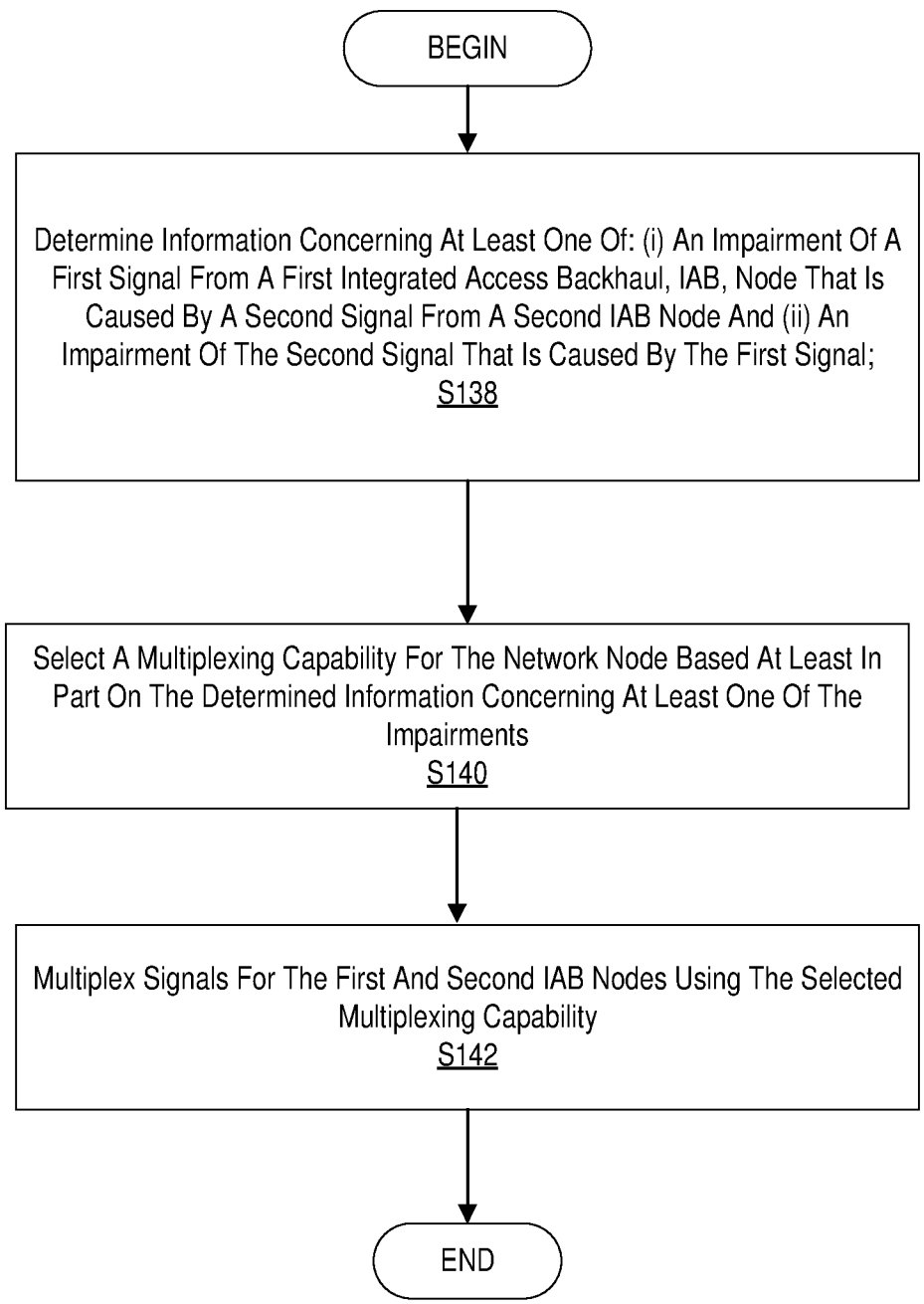
FIG. 8 is a flowchart of another exemplary process in a network node for determining a capability of simultaneous operation in integrated access and backhaul (IAB) nodes.

FIG. 8 is a flowchart of an exemplary process in a network node 16 for determining a capability of simultaneous operation in an integrated access and backhaul (IAB) nodes. The One or more blocks described herein may be performed by one or more elements of network node 16 such as by one or more of processing circuitry 68, processor 70, radio interface 62 and/or communication interface 60. Network node 16 such as via processing circuitry 68 and/or processor 70 and/or radio interface 62 and/or communication interface 60 is configured to determine (Block S138) information concerning at least one of: (i) an impairment of a first signal from a first integrated access backhaul, IAB, node that is caused by a second signal from a second IAB node and (ii) an impairment of the second signal that is caused by the first signal. Network node 16 such as via processing circuitry 68 and/or processor 70 and/or radio interface 62 and/or communication interface 60 is configured to select (Block S140) a multiplexing capability for the network node based at least in part on the determined information concerning at least one of the impairments. Network node 16 such as via processing circuitry 68 and/or processor 70 and/or radio interface 62 and/or communication interface 60 is configured to multiplex (Block S142) signals for the first and second IAB nodes using the selected multiplexing capability.

In some embodiments, network node 16 such as via processing circuitry 68 and/or processor 70 and/or radio interface 62 and/or communication interface 60 is configured to cause the network node to send information about the selected multiplexing capability to at least one of the first IAB node, the second IAB node and a wireless device, WD. In some embodiments, the selected multiplexing capability is one of a space division multiplexing, SDM, capability, a frequency division multiplexing, FDM, capability and a time division multiplexing, TDM, capability. In some embodiments, at least one of the SDM and FDM capability is a simultaneous transmission of a mobile termination, MT, function and a distributed unit, DU, function at the network node. In some embodiments, at least one of the SDM and FDM capability is a simultaneous reception of a mobile termination, MT, function and a distributed unit, DU, function at the network node.

In some embodiments, at least one of the SDM and FDM capability is a simultaneous transmission and reception of a mobile termination, MT, function and a distributed unit, DU, function at the network node. In some embodiments, network node 16 such as via processing circuitry 68 and/or processor 70 and/or radio interface 62 and/or communication interface 60 is configured to cause the network node to select the multiplexing capability by being configured to cause the network node to select the SDM capability when the network node is SDM capable; otherwise, select one of the FDM capability and the TDM capability. In some embodiments, network node 16 such as via processing circuitry 68 and/or processor 70 and/or radio interface 62 and/or communication interface 60 is configured to cause the network node to multiplex the signals for the first and second IAB nodes by being configured to cause the network node to simultaneously receive a third signal from the first IAB and a fourth signal from the second IAB node using the selected multiplexing capability.

In some embodiments, network node 16 such as via processing circuitry 68 and/or processor 70 and/or radio interface 62 and/or communication interface 60 is configured to cause the network node to multiplex the signals for the first and second IAB nodes by being configured to cause the network node to simultaneously transmit a third signal to the first IAB and a fourth signal to the second IAB node using the selected multiplexing capability. In some embodiments, the determined information corresponds to a level of cross link interference, CLI. In some embodiments, the determined information includes at least one of a signal-to-noise plus interference ratio, SINR, a reference signal received quality, RSRQ, a reference signal received power, RSRP, and a signal strength indicator, RSSI. In some embodiments, the multiplexing capability is based at least in part on an adjustment of at least one of: a transmit power, a beam configuration and a modulation and coding scheme, MCS.

In some embodiments, network node 16 such as via processing circuitry 68 and/or processor 70 and/or radio interface 62 and/or communication interface 60 is configured to cause the network node to receive requirement information prior to receiving the first signal from the first IAB node, the requirement information comprising information concerning at least one of: an interference level threshold, a backhaul link minimum data rate and a link reliability. In some embodiments, network node 16 such as via processing circuitry 68 and/or processor 70 and/or radio interface 62 and/or communication interface 60 is configured to cause the network node to determine a transmit power relation based at least in part on a cross link interference, CLI, threshold.

In some embodiments, the transmit power relation that is based at least in part on the CLI threshold is at least one of a minimum power relation and a maximum power relation. In some embodiments, network node 16 such as via processing circuitry 68 and/or processor 70 and/or radio interface 62 and/or communication interface 60 is configured to cause the network node to transmit the transmit power relation to at least one of the first and second IAB nodes. In some embodiments, the first IAB node is one of the WD, a parent IAB node and a child IAB node to the network node and the second IAB node is another one of the WD, the parent IAB node and the child IAB node.

Having described the general process flow of arrangements of the disclosure and having provided examples of hardware and software arrangements for implementing the processes and functions of the disclosure, the sections below provide details and examples of arrangements for determining a capability of simultaneous operation in an integrated access and backhaul (IAB).

Some embodiments provide efficient methods for simultaneous transmission and/or reception at an IAB node. More particularly, some embodiments include methods for determining a capability of simultaneous reception and transmission at an IAB node.

Referring again to FIG. 1, the case with the IAB parent node 36 and the IAB child node 32 being candidates for simultaneous data transmission to the IAB intermediate node 34 is considered. Note that some or all of the functionality described herein for the IAB intermediate node 34 may also reside in the IAB parent node 36 and/or IAB child node 32, or even a WD 22. Thus, the IAB child node 32 is shown residing in the network node 16c for the sake of explanation, but the IAB child node 32 could reside in another network node 16 or in a WD 22.

Assume that the IAB intermediate node 34 is configured to receive separate signals from the child and parent IAB nodes 32 and 36, respectively, such that it can determine information about interference levels of these signals on each other. Using this information, the IAB intermediate node 34 can determine if SDM or FDM based data reception at the DU and MT of the IAB intermediate node 34 is possible. If so, the IAB intermediate node 34 may inform the other network nodes (e.g., parent-nodes 36 or donor nodes 35). Also, in some embodiments, the IAB intermediate node 34 may receive information about requirements regarding interference, minimum data rates on access or backhaul links or reliability from, e.g., a central unit (CU) or the IAB parent node 36. This makes it possible for the IAB intermediate node 34 to decide an appropriate reception scheme. Then, in some embodiments, the IAB intermediate node 34 may inform the IAB parent node 36 and the IAB child node 32 about the appropriate range of transmission powers, such that successful simultaneous reception may be guaranteed. Finally, based on the determined SDM or FDM based reception capability, the IAB node may schedule the IAB child node 32 and or WDs 22, accordingly. In some embodiments, a method in an IAB intermediate node configured to determine multiplexing capability on the MT and DU sides of a radio interface 62, 82, respectively, is provided.

Figure 9:
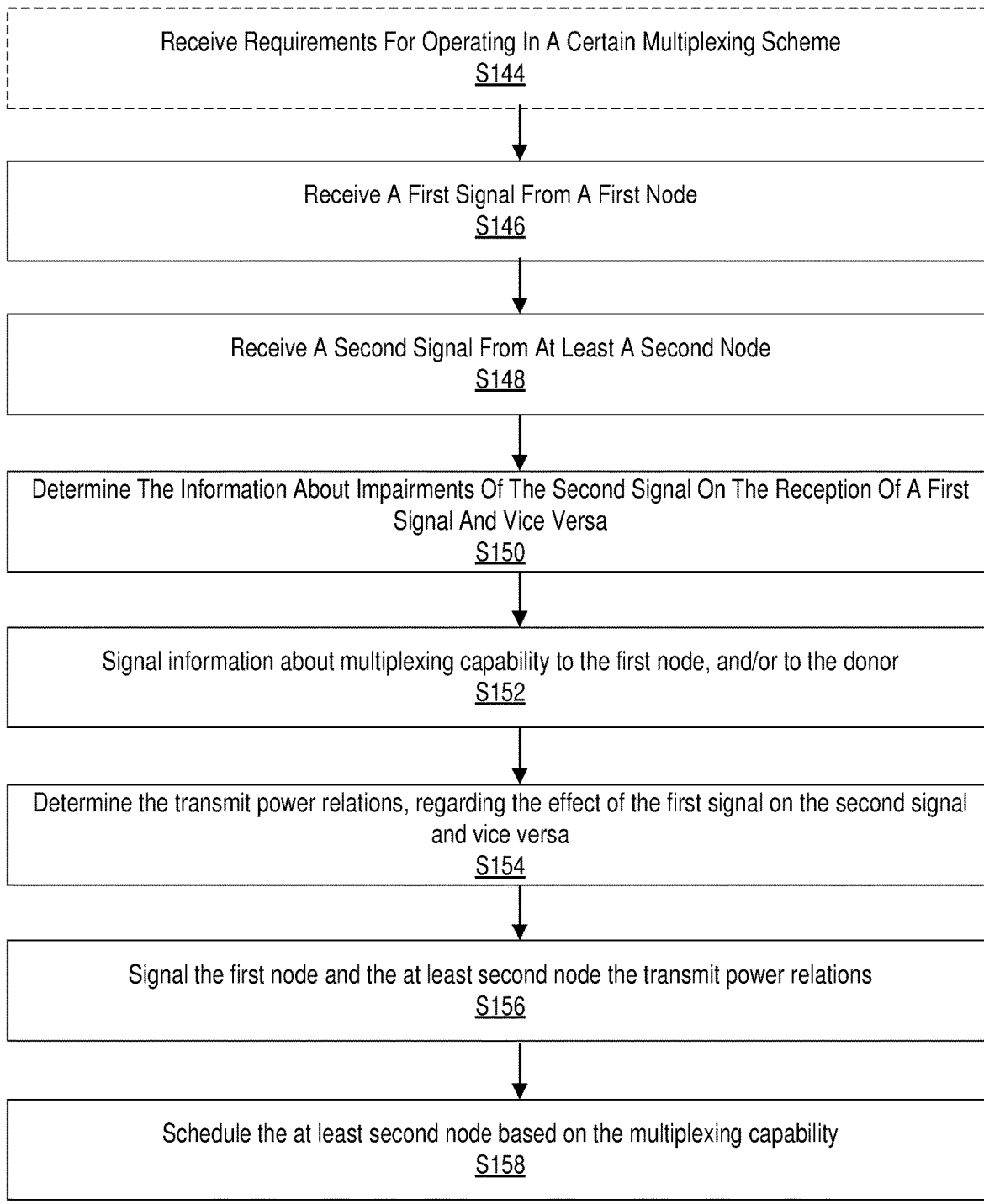
FIG. 9 is a flowchart of an exemplary process in an IAB node for determining a capability of simultaneous operation in IAB nodes.

A flowchart of such an example process is shown in FIG. 9. The process includes optionally receiving requirements for operating in a certain multiplexing scheme (Block S144). The process includes receiving a first signal from a first node (Block S146). The process also includes receiving a second signal from at least a second node (Block S148). For example, the first node may be the IAB child node 32 and the second node may be the IAB parent node 36. The process further includes determining information about impairments of the second signal from at least a second node on the reception of a first signal, and of impairments of the first signal on the reception of a second signal (Block S150). Information about impairments can be information about the level of interference or aggregated cross link interference (CLI). CLI is interference from the transmission on one link of a network node or WD on the reception of another link by a network node or WD.

Information about impairments can be information about the impact of interference on the first and/or second signal. Information about impairments can be information about signal to interference plus noise ratio (SINR) and/or reference signal received power (RSRP) and/or reference signal received quality (RSRQ) and/or received signal strength indicator (RSSI)

Based on the determined information about impairments, the process includes signaling information or indicating otherwise about multiplexing capability to the first node, and/or to the donor-CU (Block S152). Information about multiplexing capability can be information about Space-Division-Multiplexing (SDM). Information about multiplexing capability can be information about Frequency-Division-Multiplexing (FDM). Information about multiplexing capability can be information about Time-Division-Multiplexing (TDM). In some embodiments, the first signal and/or the at least second signal is a reference signal. In some embodiments, the determination and indication of a certain multiplexing capability can be conditional on a first node and/or the at least second node (in general the transmitting nodes) adjusting transmit (Tx) power and/or beam configuration and/or modulation and coding scheme (MCS), possibly including the amount or kind of adjustment. In some embodiments, prior to receiving the first signal, the IAB intermediate node 34 receives information about requirement(s) for operating in a certain multiplexing scheme from, e.g., the CU donor node 35 or the IAB parent node 36.

Information about requirements can be information regarding an interference level, such as a threshold, and/or minimum data rates on access or backhaul links and/or link reliability, but is not limited to such information. Based on the information about requirements related to interference or CLI level or threshold, transmit power relations may be determined by the IAB intermediate node 34, regarding the effect of the first signal on the second signal and vice versa (Block S154). Transmit power relations can be minimum transmit power relations. Transmit power relations can be maximum transmit power relations. The power relations may be signaled to the first node and the at least second node (Block S156). As a possible but not limiting setup, the IAB intermediate node 34 may send a range of maximum and/or minimum transmission powers to the first and the at least second nodes, such that successful simultaneous signal reception of the IAB intermediate node 34 is guaranteed.

Based on the determined multiplexing capability, the at least second node may be scheduled based on the multiplexing capability (Block S158). If the determined multiplexing capability is SDM, then SDM is used for scheduling a grant. But if not SDM capable, then FDM or TDM may be used with first node scheduling.

As an alternative to the capability signaling based on a received resource configuration (H/S/NA), the IAB intermediate node 34 can opt to schedule (or grant) an IAB child node 32 with SDM using all resources or with FDM using only H and possibly S resources. Whether SDM and FDM are used to schedule an IAB child node 32 is based on which scheduling alternative results in the larger system throughput, taking into account respective SINR levels for both channels. For this case, MCS/MIMO settings may be adapted to the chosen multiplexing scheme. Furthermore, the MCS/MIMO settings and transmit power may further be adapted to allow for reception at either the IAB node or its parent node based, e.g., on the reciprocal channel assumption, with a predetermined error margin.

In this way, the capability of the SDM-based simultaneous signal reception is determined, leading to an improved end to end throughput and lower transmission delay as compared to known methods. Some embodiments encompass setup of signal reception by the IAB intermediate node 34 from the IAB parent nodes 36 and the IAB child nodes 32. Note that there may be more than one IAB parent node 36 and more than one IAB child node 32 may be provided.

While some example embodiments utilize simultaneous signal reception of the IAB intermediate node 34, the same technique is applicable for the cases with simultaneous transmission from the IAB intermediate node 34 DU and MT. Here, the IAB intermediate node 34 sends one signal, e.g., a reference signal, to the IAB parent node 36 and to the IAB child node 32, and the IAB intermediate node 34 can get information about, e.g., causing interference through receiving feedback information from the child and parent nodes 32 and 36, respectively. Alternatively, by assuming reciprocal channels, the IAB intermediate node 34 can derive the interference or CLI impact from its own channel estimates based on received signals.

For SDM-based data reception, the same approach can be improved to determine the FDM capability with, for example, send/receive signals, or reference signals, on the parent and child links with different combinations of resource blocks (RBs).

In some embodiments, the SDM/FDM capability decision is made at the IAB intermediate node 34. However, this is not necessary, and the decision can be made at the IAB parent node 36 or the Donor-CU 35. In each case, depending on the node responsible for decision making, appropriate signaling may be employed to inform the IAB intermediate node 34 about the aggregated CLI of the links.

The signals used to determine multiplexing capabilities can be configured by:
IAB Donor CU 35;
IAB Parent node 36 DU;
IAB Child node 32 MT; or
IAB intermediate node 34 DU and MT.

In some embodiments, the interference information regarding other neighbouring IAB nodes, which are neither parent nodes nor child nodes, could also be taken into consideration in determining multiplexing capabilities, e.g., SDM/FDM, of the IAB node.

Thus, some embodiments include a network node 34 configured to communicate with an integrated access and backhaul, IAB, node 22, 32, 36. The network node 34 includes a radio interface 62 and/or processing circuitry 68 configured to determine information concerning impairments of a first signal from a first IAB node 22, 32, 36 caused by a second signal from a second IAB node 22, 32, 36 and/or concerning impairments of the second signal caused by the first signal. The network node 34, processing circuitry 68 and/or radio interface 62 are further configured to, based at least in part on the determined impairment information, determine a multiplexing capability of the network node 34 for multiplexing signals to at least one of the first and second IAB node.

According to this aspect, in some embodiments, the determined impairment information includes information concerning a level of cross link interference, CLI. In some embodiments, the determined impairment information includes signal to noise plus interference ratio, SINR and/or reference signal received quality, RSRQ, and/or received signal strength indicator, RSSI. In some embodiments, the multiplexing capability is at least one of space division multiplexing, SDM, frequency division multiplexing, FDM, and time division multiplexing, TDM. In some embodiments, the multiplexing capability is based at least in part on an adjustment of transmit power and/or beam configuration and/or modulation and coding scheme, MCS. In some embodiments, prior to receiving the first signal from the first IAB node, the radio interface 62 is configured to receive information concerning an interference level threshold and/or backhaul link minimum data rates and/or link reliability. In some embodiments, the network node 34, processing circuitry 68 and/or radio interface 62 are further configured to determine transmit power relations based at least in part on a cross link interference, CLI, threshold. In some embodiments, the transmit power relations are minimum power relations and/or maximum power relations. In some embodiments, the radio interface signals transmit power relations to the first and/or second IAB nodes. In some embodiments, based at least in part on the determined multiplexing capability, the network node 34, processing circuitry 68 and/or radio interface 62 are configured to provide space division multiplexing, SDM, capability when the network node is SDM capable, and provide frequency division multiplexing, FDM, and/or time division multiplexing, TDM, when the network node is not SDM capable.

According to another aspect, a method implemented in a network node 34 includes determining, via the processing circuitry 68 and/or radio interface 62, information concerning impairments of a first signal from a first IAB node caused by a second signal from a second IAB node and/or concerning impairments of the second signal caused by the first signal. The method also includes, based at least in part on the determined impairment information, determining a multiplexing capability of the network node 34 for multiplexing signals to at least one of the first and second IAB nodes 22, 32, 36.

According to this aspect, in some embodiments, the determined impairment information includes information concerning a level of cross link interference, CLI. In some embodiments, the determined impairment information includes signal to noise plus interference ratio, SINR and/or reference signal received quality, RSRQ, and/or received signal strength indicator, RSSI. In some embodiments, the multiplexing capability is at least one of space division multiplexing, SDM, frequency division multiplexing, FDM, and time division multiplexing, TDM. In some embodiments, the multiplexing capability is based at least in part on an adjustment of transmit power and/or beam configuration and/or modulation and coding scheme, MCS. In some embodiments, prior to receiving the first signal from the first IAB node, the method includes receiving, via the radio interface 62, information concerning an interference level threshold and/or backhaul link minimum data rates and/or link reliability. In some embodiments, the method further includes determining, via the processing circuitry 68 and/or radio interface 62, transmit power relations based at least in part on a cross link interference, CLI, threshold. In some embodiments, the transmit power relations are minimum power relations and/or maximum power relations. In some embodiments, the method also includes transmitting the transmit power relations to the first and/or second IAB nodes. In some embodiments, based at least in part on the determined multiplexing capability, the method includes providing, via the processing circuitry 68 and radio interface 62, space division multiplexing, SDM, capability when the network node 34 is SDM capable, and providing frequency division multiplexing, FDM, and/or time division multiplexing, TDM, when the network node is not SDM capable.

Some embodiments may include one or more of the following:

Embodiment A1. A network node configured to communicate with an integrated access and backhaul, IAB, node, the network node configured to, and/or comprising a radio interface and/or comprising processing circuitry configured to:

determine information concerning impairments of a first signal from a first IAB node caused by a second signal from a second IAB node and/or concerning impairments of the second signal caused by the first signal; and based at least in part on the determined impairment information, determine a multiplexing capability of the network node for multiplexing signals to at least one of the first and second IAB node.

Embodiment A2. The network node of Embodiment A1, wherein the determined impairment information includes information concerning a level of cross link interference, CLI.

Embodiment A3. The network node of any of Embodiments A1 and A2, wherein the determined impairment information includes signal to noise plus interference ratio, SINR and/or reference signal received quality, RSRQ, and/or received signal strength indicator, RSSI.

Embodiment A4. The network node of any of Embodiments A1-A3, wherein the multiplexing capability is at least one of space division multiplexing, SDM, frequency division multiplexing, FDM, and time division multiplexing, TDM.

Embodiment A5. The network node of any of Embodiments A1-A4, wherein the multiplexing capability is based at least in part on an adjustment of transmit power and/or beam configuration and/or modulation and coding scheme, MCS.

Embodiment A6. The network node of any of Embodiments A1-A5, wherein prior to receiving the first signal from the first IAB node, the radio interface is configured to receive information concerning an interference level threshold and/or backhaul link minimum data rates and/or link reliability.

Embodiment A7. The network node of any of Embodiments A1-A6, wherein the network node, processing circuitry and/or radio interface are further configured to determine transmit power relations based at least in part on a cross link interference, CLI, threshold.

Embodiment A8. The network node of Embodiment A7, wherein the transmit power relations are minimum power relations and/or maximum power relations.

Embodiment A9. The network node of Embodiment A8, wherein the radio interface signals transmit power relations to the first and/or second IAB nodes.

Embodiment A10. The network node of any Embodiments A1-A9, wherein based at least in part on the determined multiplexing capability, the network node, processing circuitry and/or radio interface are configured to provide space division multiplexing, SDM, capability when the network node is SDM capable, and provide frequency division multiplexing, FDM, and/or time division multiplexing, TDM, when the network node is not SDM capable.

Embodiment B1. A method implemented in a network node, the method comprising determining information concerning impairments of a first signal from a first IAB node caused by a second signal from a second IAB node and/or concerning impairments of the second signal caused by the first signal; and based at least in part on the determined impairment information, determining a multiplexing capability of the network node for multiplexing signals to at least one of the first and second IAB node.

Embodiment B2. The method of Embodiment B1, wherein the determined impairment information includes information concerning a level of cross link interference, CLI.

Embodiment B3. The method of any of Embodiments B1 and B2, wherein the determined impairment information includes signal to noise plus interference ratio, SINR and/or reference signal received quality, RSRQ, and/or received signal strength indicator, RSSI.

Embodiment B4. The method of any of Embodiments B1-B3, wherein the multiplexing capability is at least one of space division multiplexing, SDM, frequency division multiplexing, FDM, and time division multiplexing, TDM.

Embodiment B5. The method of any of Embodiments B1-B4, wherein the multiplexing capability is based at least in part on an adjustment of transmit power and/or beam configuration and/or modulation and coding scheme, MCS.

Embodiment B6. The method of any of Embodiments B1-B5, wherein, prior to receiving the first signal from the first IAB node, the method further includes receiving information concerning an interference level threshold and/or backhaul link minimum data rates and/or link reliability.

Embodiment B7. The method of any of Embodiments B1-B6, further comprising determining transmit power relations based at least in part on a cross link interference, CLI, threshold.

Embodiment B8. The method of Embodiment B7, wherein the transmit power relations are minimum power relations and/or maximum power relations.

Embodiment B9. The method of Embodiment B8, further comprising transmitting the transmit power relations to the first and/or second IAB nodes.

Embodiment B10. The method of any Embodiments B1-B9, wherein based at least in part on the determined multiplexing capability, providing space division multiplexing, SDM, capability when the network node is SDM capable, and providing frequency division multiplexing, FDM, and/or time division multiplexing, TDM, when the network node is not SDM capable.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node, the method comprising:
   determining information concerning at least one of: (i) an impairment of a first signal from a first integrated access backhaul, (IAB) node that is caused by a second signal from a second IAB node and (ii) an impairment of the second signal that is caused by the first signal;
   selecting a multiplexing capability for the network node based at least in part on the determined information concerning at least one of the impairments; and
   multiplexing signals for the first and second IAB nodes using the selected multiplexing capability;
   receiving requirement information prior to receiving the first signal from the first IAB node, the requirement information comprising information concerning at least one of: an interference level threshold, a backhaul link minimum data rate, and a link reliability;
   determining a transmit power relation based at least in part on a cross link interference (CLI) threshold, wherein the transmit power relation that is based at least in part on the CLI threshold is at least one of a minimum power relation and a maximum power relation; and
   transmitting the transmit power relation to at least one of the first and second IAB nodes, wherein the first IAB node is one of a wireless device (WD), a parent IAB node and a child IAB node to the network node, and the second IAB node is another one of the WD, the parent IAB node and the child IAB node.

2. The method of claim 1, further comprising sending information about the selected multiplexing capability to at least one of the first IAB node, the second IAB node and a wireless device (WD), wherein the selected multiplexing capability is one of a space division multiplexing (SDM) capability, a frequency division multiplexing (FDM) capability, and a time division multiplexing (TDM) capability.

3. The method of claim 2, wherein at least one of the SDM and FDM capability is a simultaneous transmission of a mobile termination (MT) function and a distributed unit (DU) function at the network node.

4. The method of claim 2, wherein at least one of the SDM and FDM capability is a simultaneous reception of a mobile termination (MT) function and a distributed unit (DU) function at the network node.

5. The method of claim 2, wherein at least one of the SDM and FDM capability is a simultaneous transmission and reception of a mobile termination (MT) function and a distributed unit (DU) function at the network node.

6. The method of claim 2, wherein selecting the multiplexing capability comprises selecting the SDM capability when the network node is SDM capable; otherwise, selecting one of the FDM capability and the TDM capability.

7. The method of claim 1, wherein multiplexing the signals for the first and second IAB nodes comprises simultaneously receiving a third signal from the first IAB and a fourth signal from the second IAB node using the selected multiplexing capability.

8. The method of claim 1, wherein multiplexing the signals for the first and second IAB nodes comprises simultaneously transmitting a third signal to the first IAB and a fourth signal to the second IAB node using the selected multiplexing capability.

9. The method of claim 1, wherein the determined information corresponds to a level of cross link interference (CLI), wherein the determined information includes at least one of a signal-to-noise plus interference ratio (SINR), a reference signal received quality (RSRQ), a reference signal received power (RSRP), and a signal strength indicator (RSSI), and wherein the multiplexing capability is based at least in part on an adjustment of at least one of: a transmit power, a beam configuration, and a modulation and coding scheme (MCS).

10. A network node configured to communicate with a wireless device (WD), the network node comprising processing circuitry, the processing circuitry being configured to cause the network node to:
    determine information concerning at least one of: (i) an impairment of a first signal from a first integrated access backhaul (IAB) node that is caused by a second signal from a second IAB node and (ii) an impairment of the second signal that is caused by the first signal;
    select a multiplexing capability for the network node based at least in part on the determined information concerning at least one of the impairments; and multiplex signals for the first and second IAB nodes using the selected multiplexing capability;
    cause the network node to receive requirement information prior to receiving the first signal from the first IAB node, the requirement information comprising information concerning at least one of: an interference level threshold, a backhaul link minimum data rate, and a link reliability;
    cause the network node to determine a transmit power relation based at least in part on a cross link interference (CLI) threshold, wherein the transmit power relation that is based at least in part on the CLI threshold is at least one of a minimum power relation and a maximum power relation; and
    cause the network node to transmit the transmit power relation to at least one of the first and second IAB nodes, wherein the first IAB node is one of a wireless device (WD), a parent IAB node and a child IAB node to the network node, and the second IAB node is another one of the WD, the parent IAB node and the child IAB node.

11. The network node of claim 10, wherein the processing circuitry is configured to cause the network node to send information about the selected multiplexing capability to at least one of the first IAB node, the second IAB node and a wireless device (WD), and wherein the selected multiplexing capability is one of a space division multiplexing (SDM) capability, a frequency division multiplexing (FDM) capability, and a time division multiplexing (TDM) capability.

12. The network node of claim 11, wherein at least one of the SDM and FDM capability is a simultaneous transmission of a mobile termination (MT) function and a distributed unit, DU, (DU) function at the network node.

13. The network node of claim 11, wherein at least one of the SDM and FDM capability is a simultaneous reception of a mobile termination (MT) function and a distributed unit (DU) function at the network node.

14. The network node of claim 11, wherein at least one of the SDM and FDM capability is a simultaneous transmission and reception of a mobile termination (MT) function and a distributed unit (DU) function at the network node.

15. The network node of claim 11, wherein selecting the multiplexing capability comprises selecting the SDM capability when the network node is SDM capable; otherwise, selecting one of the FDM capability and the TDM capability.

16. The network node of claim 10, wherein the processing circuitry is further configured to multiplex the signals for the first and second IAB nodes by being configured to cause the network node to simultaneously receive a third signal from the first IAB and a fourth signal from the second IAB node using the selected multiplexing capability.

17. The network node of claim 10, wherein the processing circuitry is further configured to multiplex the signals for the first and second IAB nodes by being configured to cause the network node to simultaneously transmit a third signal to the first IAB and a fourth signal to the second IAB node using the selected multiplexing capability.

18. The network node of claim 10, wherein the determined information corresponds to a level of cross link interference (CLI), wherein the determined information includes at least one of a signal-to-noise plus interference ratio (SINR), a reference signal received quality (RSRQ), a reference signal received power (RSRP), and a signal strength indicator (RSSI), and wherein the multiplexing capability is based at least in part on an adjustment of at least one of: a transmit power, a beam configuration, and a modulation and coding scheme (MCS).

\* \* \* \* \*